United States Patent [19]

Allemann et al.

[11] Patent Number: 4,772,327

[45] Date of Patent: Sep. 20, 1988

[54] EASY-WORKING SPRAY CONCRETE

[75] Inventors: Kurt Allemann, Schmitten, Switzerland; Klaus Deneke; Hansjürgen Hass, both of Troisdorf, Fed. Rep. of Germany; Günter Vogel, Hennef, Fed. Rep. of Germany

[73] Assignee: Dynamit Nobel AG, Troisdorf bez. Koeln, Fed. Rep. of Germany

[21] Appl. No.: 790,899

[22] Filed: Oct. 24, 1985

[30] Foreign Application Priority Data

Oct. 27, 1984 [DE] Fed. Rep. of Germany ....... 3439445

[51] Int. Cl.$^4$ ..................... C04B 22/00; C04B 24/00
[52] U.S. Cl. ............................ 106/90; 106/314; 106/315
[58] Field of Search ................ 106/90, 97, 314, 315

[56] References Cited

U.S. PATENT DOCUMENTS

| | | | |
|---|---|---|---|
| 3,874,885 | 4/1975 | Lyass et al. | 106/97 X |
| 4,234,347 | 11/1980 | Kirilishin | 106/314 X |
| 4,247,334 | 1/1981 | Falcoz et al. | 106/314 X |
| 4,306,912 | 12/1981 | Forss | 106/315 X |
| 4,345,944 | 8/1982 | Kazama et al. | 106/90 |
| 4,444,593 | 8/1984 | Schutz | 106/89 |
| 4,504,315 | 3/1985 | Allemann et al. | 106/315 X |

FOREIGN PATENT DOCUMENTS

| | | |
|---|---|---|
| 192838 | 11/1957 | Austria . |
| 120812 | 10/1984 | European Pat. Off. . |
| 2130257 | 8/1974 | Fed. Rep. of Germany . |
| 3306448 | 8/1984 | Fed. Rep. of Germany ........ 106/97 |
| 144872 | 12/1978 | Japan ..................... 106/90 |
| 4924 | 1/1979 | Japan ..................... 106/315 |
| 134735 | 10/1979 | Japan ..................... 106/315 |
| 207861 | 11/1984 | Japan ..................... 106/90 |
| 94177 | 4/1922 | Switzerland . |

OTHER PUBLICATIONS

Ramachandran, "Concrete Admixtures Handbook" 1984, p. 581.

*Primary Examiner*—Mark L. Bell
*Assistant Examiner*—Ann M. Knab
*Attorney, Agent, or Firm*—Felfe & Lynch

[57] ABSTRACT

Disclosed is a spray concrete which, even at a water-cement ratio of 0.45 to 0.55, is still easy to work, can be sprayed well, and sets and hardens rapidly. It contains, in addition to the conventional additives, additions of naphthalinesulfonicacid-formaldehyde condensation products and highly concentrated alkaline aqueous solutions of potassium aluminate, potassium carbonate and caustic potash. The concrete according to the invention displays an especially rapid solidification when it contains up to 3% by weight alkali silicates or an adequate amount in highly dispersed silicic acid (SiO$_2$). The additives are incorporated into the concrete preferably directly at the worksite prior to spraying.

6 Claims, No Drawings

EASY-WORKING SPRAY CONCRETE

BACKGROUND OF THE INVENTION

The subject matter of the present invention is a spray concrete that is easy to work even at a relatively low water-cement ratio, can be sprayed well, and sets and hardens rapidly. These properties are achieved by adding to the spray concrete certain concrete liquefiers and accelerators before it emerges from the spray nozzle.

It is known to use as a starting mixture for the wet-spray process wet mixtures of cement, additives, water, and additives if used, as specified in DIN 18551. This wet mixture is delivered either pneumatically through the spray nozzle to the point of application (thin-stream method) or it is pumped hydraulically to the spray nozzle (solid-stream method), where it is converted by compressed air to a thin stream. In both cases the wet mixture that is applied is in close contact with the water for a certain amount of time, which in practice can amount to as much as 90 minutes, and has already reacted with it.

It is also known to add an accelerator to a spray concrete so that the concrete will set as rapidly as possible after it is sprayed on. The accelerator is added just before spraying, preferably directly as it is used at the point of application. The accelerators include concentrated solutions of alkali aluminates, alkali hydroxides and alkali carbonates, such as those described, for example, in U.S. Pat. No. 4,504,315. The accelerators cited therein exercise their full action in the dry spraying process when they are added together with the water (hereinafter also called "mixing water") to the dry-spray concrete according to DIN 18551. Then they act spontaneously on the cement to accelerate setting in the mixing water at the spray nozzle directly at the point of application of the spray concrete. If, however, the spray concrete has already been mixed with the mixing water for a longer period of time and has already reacted, as is the case in the wet-spray process, the accelerators described in U.S. Pat. No. 4,504,315 could no longer produce their optimum effect.

The sole use of liquid accelerators in the wet spray process can cause the consistency of the spray concrete after emerging from the nozzle to be too low, so that the concrete adheres insufficiently especially to vertical walls and overhead areas. Increasing the consistency of the spray concrete by adding lesser amounts of mixing water to obviate this disadvantage is impossible, because then the concrete will no longer be able to be pumped or driven, so that another way of avoiding this disadvantage must be sought.

One known answer to the problem of pumping spray concrete with a low water-cement ratio consists in adding known concrete liquefiers to the concrete. Such additives do increase the readiness of fresh concrete to be pumped and worked, yet they diminish the action of many commonly used accelerators. Thus for example, the solidification accelerating action of the potassium aluminate-base solidification accelerators listed in U.S. Pat. No. 4,504,315 is partially or entirely cancelled by the known concrete liquefiers of technical grade based on alkalinized or neutralized salts of lignin sulfonates. This disadvantage is obviated by using known concrete liquefiers conjunction with water glass. The latter, however, must be added in amounts between 10 and 15% with respect to the cement in order to achieve an adequate hardening action. These amounts, however, have the disadvantage, in turn, that the strength of the set concrete is diminished. The loss of strength can amount to as much as 50% and more.

The problem therefore was to find a spray concrete liquefying and strengthening system that would keep the spray concrete easy to work at the lowest possible water-cement ratios, so that it could easily be pumped in the spray equipment, and at the same time produce the quickest possible stiffening, setting and hardening of the concrete after leaving the spray nozzle. The liquefier contained in the system must therefore not have a negative influence on the action of the accelerator.

The Invention

As a solution to this problem, a spray concrete using concrete liquefiers and hardening accelerators has been found which contains as concrete liquefier one or more compounds from the class of the naphthalinesulfonicacidformaldehyde condensation products and, as stiffening accelerators, highly concentrated alkaline aqueous solutions of potassium aluminate, caustic potash and potassium carbonate.

Such a spray concrete is especially readily workable and can easily be pumped in the known concrete spray equipment, adheres well to vertical walls and overhead surfaces without running down or falling off, and rapidly hardens to a solid mass of high end strength. Ready workability in the sense of the invention means that, for pumping and application, the concrete has a spread, which is correlated with its consistency, of at least 45 cm, i.e., it is adapted to the known given working conditions, without the occurrence of difficulties based on its composition.

The action of the above-named additives can be further improved if the spray concrete additionally contains silicate systems such as finely distributed or highly dispersed $SiO_2$ or water-soluble alkali silicates in amounts up to 3.0 weight-percent. Preferably the amount of these alkali silicates is between 0.25 and 2.0 weight-percent. $SiO_2$ can, preferably, be used in amounts up to 2.5% depending on the $SiO_2$ content or dispersity. Such a spray concrete with these additional components can also be used at temperatures below $\pm 15°$ C. This is not possible in the case of the known spray-concrete mixtures which contain water glass in amounts of about 10.0 to 12.0 weight-percent, since the high viscosity of the water glass at these temperatures, if large amounts are used, has an unfavorable action.

On the basis of the above-named additions, the wet spray concrete according to the invention can have a water-cement ratio of about 0.44 to 0.55; preferably it is between 0.45 and 0.47.

The concrete liquefiers on the basis of naphthalinesulfonicacid-formaldehyde condensation products are substances, known in themselves, which are used as dispersants for pigments and tanning agents. They are prepared by condensing the corresponding naphthalinesulfonic acids with formaldehyde and, if necessary, neutralized with lyes in aqueous solutions. They are also referred to as condensation products of naphthalinesulfonic acid with formaldehyde (cf. Ullmann "Encyclopädie der techn. Chemie," 3rd ed., vol. 17, page 80). Their use as concrete liquefiers is described, for example, in U.S. Pat. No. 4,247,334. There, however, these substances serve only for the liquefaction of the system, and are not used in combination with solidification accelerators.

In contrast to other concrete liquefiers, e.g., those on the basis of lignin sulfonates, they do not interfere with the action of accelerators according to the teaching of U.S. Pat. No. 4,504,315. Instead, they form with these accelerators a synergistic system which produces extraordinarily short setting times and a very good development of strength in spray concrete.

The amount of concrete liquefier to be added is of the same order of magnitude as in the known systems. In general, amounts between 0.2 and 3.0 weight-percent with respect to the cement content of the spray concrete will suffice.

The amounts of the concrete liquefier to be used in practice will depend, for one thing, on the water-cement ratio of the wet mixture, on its composition, and on the compounds that are used. The optimum amount must therefore be determined by preliminary testing.

The concrete stiffening accelerators used according to the invention are described in U.S. Pat. No. 4,504,315. This patent is specifically referred to herewith. These substances are concentrated solutions of potassium carbonate and potassium aluminate in water with an excess KOH content. The potassium carbonate and KOH content can, however, be higher than is stated there; the molar ratio of the $K_2O$ not bound as potassium carbonate to $Al_2O_3$ can be between 1.1 and 1.6, and the content in potassium carbonate can be between 0.1 and 6 mol %. Also, a higher dilution can be used, the molar ratio $H_2O:Al_2O_3$ being able to be between 9.5 and 30. According to the invention, however, they are not added to the mixing water as described in U.S. Pat. No. 4,504,315, but to the wet mixture. Their content in the spray concrete can be somewhat greater than stated in this patent. It is generally between 2.0 and 5.0 weight-percent with respect to the cement content in the spray concrete. The optimum action will depend on, among other things, the nature and amount of the concrete liquefier and on the rheological properties of the wet mixture in question.

The additives according to the invention are added to the fresh concrete preferably directly at the worksite. They are preferably added directly before spraying, by means of known and appropriate feed means. The concrete liquefiers are incorporated insofar as possible immediately before the fresh concrete is introduced into the solid stream pumping system, while the concrete accelerator is added only at the end of the solid-stream pumping system, preferably ahead of or within the spray nozzle.

The water-soluble alkali silicates are sodium and potassium silicates, known in themselves, which are also known as soda or potash water glasses. The addition of these products can be performed either together with the concrete liquefiers or before or after the addition of the hardening accelerators. The first-named variant makes possible the uniform distribution of these substances in a simple manner. If the concrete liquefier and alkali silicate are added simultaneously, however, the synergistic action with the hardening accelerator is lower than when the silicates are added to the thin stream. In the case of addition to the thin stream, the alkali silicate develops its maximum effect. At the same time, however, it must be assured that the relatively small amount is accurately proportioned and is well distributed in the thin steam. In place of alkali silicates, the above-named highly dispersed silicic acid ($SiO_2$) can be used.

The admixture of the components according to the invention to the thin stream is performed by measures known in themselves, such as injection or spraying through a nozzle, using known devices.

EXAMPLES

Fresh mortar was prepared from three parts standard sand according to DIN 1164, Part 7, and one part commercial Portland cement PZ-35F with a water-cement ratio of 0.52. All components were at room temperature (about 21° C.) or were cooled to about 10° C. At these temperatures the fresh mortars were let stand for 30 minutes in each case. Then the additives listed in Table 1 and Table 2 were added at the end of the periods specified therein, in the same test amounts in each case.

The testing of the setting process was performed by means of a cone according to DIN 1168 with a test load of 270 gm, the diminishing depth of penetration being recorded at intervals of one minute. This depth of penetration, which is a measure of the setting speed, is specified in Table 1 as the "cone penetration depth." In Table 1, furthermore, A represents a concrete liquefier on the basis of naphthalinesulfonic acid-formaldehyde condensate in the form of a 40% solution. Proportion: 0.5 wt.-% with respect to the cement;

B represents alkali silicate solution in the form of a 35% solution, used in the amount of 1.0 weight-percent with respect to the cement content, and C represents a concrete accelerator composed of potassium aluminate, potassium hydroxide and calcium carbonate according to the teaching of U.S. Pat. No. 4,504,315, in an approximately 50% solution, in a proportion of 3.0 weight-percent with respect to the cement.

In the last column of Table 1 are listed the spread dimensions a15 of fresh concrete. O concretes (examples 1 and 4) are compared with fresh concretes to which the additives A and B according to the invention were admixed individually and in combination 30 minutes after the fresh concretes were prepared. The measurements took place at the temperatures specified in Table 1. The greater spread dimensions are an indication of the easier workability of the fresh concretes.

The composition of the test concretes was in accordance with the "Additive Guidelines.", according to German "Richthüien für die Zuteilung von Prüfzeichen für Betouzusoctzuüittel (Prüfrichtlüieu) Folssuing February 1984"

TABLE 1

| Example No. | T [°C.] | Additive added after 30' | Additive added after 45' | Cone penetration depth [mm] 1 [min] | 2 [min] | 3 [min] | 4 [min] | 5 [min] | 6 [min] | Spread $a_{15}$ |
|---|---|---|---|---|---|---|---|---|---|---|
| 1 | 10 | — | C | >40 | 20 | 14 | 8 | 8 | 4 | 43.4 |
| 2 | 10 | A | C | 35 | 16 | 14 | 9 | 9 | 8 | 52.2 |
| 3 | 10 | A + B | C | 31 | 18 | 8 | 6 | 3 | 1 | 47.2 |
| 4 | 20 | — | C | 24 | 12 | 7 | 5 | 5 | 2 | 44.2 |
| 5 | 20 | A | C | 22 | 11 | 8 | 6 | 5 | 2 | 56.6 |
| 6 | 20 | A + B | C | 20 | 8 | 6 | 3 | 2 | 0 | 49.2 |
| 7 | 20 | A | C | 15 | 8 | 3 | 3 | 1 | 0 | 42.8 |

TABLE 1-continued

| Example No. | T [°C.] | Additive added after 30' | after 45' | Cone penetration depth [mm] 1 [min] | 2 [min] | 3 [min] | 4 [min] | 5 [min] | 6 [min] | Spread $a_{15}$ |
|---|---|---|---|---|---|---|---|---|---|---|
| 8 | 20 | A | C + B | 10 | 2 | 0 | 0 | 0 | 0 | 56.6 |

Examples 1, 4 and 7 are given for comparison, and do not involve a composition according to the invention as an additive. In these examples either the spread $a_{15}$ is too small, or also the setting is unsatisfactory. Although Example 7 shows good setting, its spread $a_{15}$ of 42.8 cm does not satisfy the requirements to be met by the rheological behavior of a corresponding fresh concrete upon delivery to the solid stream pumping system: as a rule, a spread $a_{15}$ of at least 45 cm is required. Wet mixtures having a lesser spread $a_{15}$ must not be used in a solid stream pumping system.

The requirement for a sufficient spread a15 of at least 45 cm is satisfied by the mixtures of examples 2, 3, 5, 6 and 8. Examples 3 and 6 are very good examples of the synergistic action of additives A and B, especially with regard to stiffening action.

As already stated above, the proportioning of B into C in the thin stream produces by far the strongest effect. On account of the extremely short setting time it is difficult to produce a relevant test specimen by the test method selected. The technical use of this proportioning variant thus places great demands on the system for proportioning B in the thin-stream phase in spraying concrete. It must also be assured in this case that the barely still plastic spray material is sufficiently compressed upon application and that the splash-back remains within acceptable limits.

In a further comparative testing of the additive according to the invention, corresponding to the Examples 4 to 6 of Table 1, the setting performance E of the test mortar was measured with the Vicat needle (DIN 1164, Part b). The wet mortars were prepared, unlike those of Table 1, with a water-cement ratio of 0.50 in accordance with DIN 1164, Part 7. The test temperature was 20° C., as in Examples 4 to 7 of Table 1. $E_B$ indicates the onset of hardening and $E_E$ the termination of hardening.

TABLE 2

| No. | T[°C.] | Addition of after 30' | the additive after 45' | $E_B$ | $E_E$ |
|---|---|---|---|---|---|
| 4a | 20 | — | C | 1'30" | 4'30" |
| 5a | 20 | A | C | 1'15" | 3'30" |
| 6a | 20 | A + B | C | 1'15" | 3'15" |

After the same test procedure, Example 8 of Table 1 was also varied by using amounts of 0.25, 1.0 and 1.5%, with respect to the Portland cement, of the alkali polysilicate additive B. It was then found that the previously described spontaneous action of the additive combination was produced by a proportion of only 0.25%. The effect was observed even in the mixing phase of the preparation of the samples within 20 to 40 seconds after the addition of C.

It will be understood that the specification and examples are illustrative but not limitative of the present invention and that other embodiments within the spirit and scope of the invention will suggest themselves to those skilled in the art.

We claim:

1. A readily processable spray concrete comprising concrete containing cement, a solidification accelerator and a concrete liquefier, said solidification accelerator being a highly concentrated, aqueous-alkaline solution of potassium aluminate, potassium hydroxide and potassium carbonate having a molar ratio of $K_2O$ not bound as potassium carbonate to $Al_2O_3$ between 1.1 and 1.6, a content in water of dilution such that the molar ratio of $H_2O:Al_2O_3$ is between 9.5 and 30, and a potassium carbonate content of between 0.1 and 6 mol-%; and said concrete liquefier is of one or more compounds from the class of naphthalinesulfonicacid-formaldehyde condensates.

2. The spray concrete of claim 1, wherein the molar ratio of $K_2O$ not bound as potassium carbonate to $Al_2O_3$ is 1.15 to 1.45, the water of dilution has the molar ratio $H_2O:Al_2O_3$, between 11 and 25 and the $K_2CO_3$ content is 0.1 to 5 mol-%.

3. The spray concrete of claim 1 containing the setting accelerator in an amount of 2.0 to 5.0 weight-percent with respect to the cement content.

4. The spray concrete of claim 1 having a water-cement ratio between 0.44 and 0.55.

5. The spray concrete of claim 1 additionally containing up to 3.0 weight-percent of alkali silicates or highly dispersed $SiO_2$.

6. The spray concrete of claim 1 containing the concrete liquefier in an amount of 0.2 to 3.0 weight-percent with respect to the cement content.

* * * * *

UNITED STATES PATENT AND TRADEMARK OFFICE
CERTIFICATE OF CORRECTION

PATENT NO. : 4,772,327

DATED : September 20, 1988

INVENTOR(S) : Kurt Allemann et al

It is certified that error appears in the above-identified patent and that said Letters Patent is hereby corrected as shown below:

Column 6, line 7, following "0.25," insert --0.5,--.

Signed and Sealed this

Tenth Day of April, 1990

Attest:

HARRY F. MANBECK, JR.

*Attesting Officer*

*Commissioner of Patents and Trademarks*